United States Patent
Ihs et al.

(10) Patent No.: US 9,502,978 B2
(45) Date of Patent: Nov. 22, 2016

(54) SWITCHED POWER STAGE AND A METHOD FOR CONTROLLING THE LATTER

(71) Applicant: Endura Technologies LLC, San Diego, CA (US)

(72) Inventors: Hassan Ihs, Vendargues (FR); Taner Dosluoglu, New York, NY (US)

(73) Assignee: Endura Technologies LLC, San Diego, CA (US)

(*) Notice: Subject to any disclaimer, the term of this patent is extended or adjusted under 35 U.S.C. 154(b) by 29 days.

(21) Appl. No.: 14/593,820

(22) Filed: Jan. 9, 2015

(65) Prior Publication Data

US 2016/0049860 A1 Feb. 18, 2016

Related U.S. Application Data

(60) Provisional application No. 62/037,063, filed on Aug. 13, 2014.

(51) Int. Cl.
*H02M 3/156* (2006.01)
*H02M 3/158* (2006.01)

(52) U.S. Cl.
CPC ................... *H02M 3/158* (2013.01)

(58) Field of Classification Search
CPC .... H02M 3/155; H02M 3/156; H02M 3/157; H02M 3/158; H02M 2001/0012
USPC .......... 323/222, 224, 282, 283, 284
See application file for complete search history.

(56) References Cited

U.S. PATENT DOCUMENTS

| 5,568,044 A | 10/1996 | Bittner |
| 6,166,527 A * | 12/2000 | Dwelley ............. H02M 3/1582 323/222 |

(Continued)

FOREIGN PATENT DOCUMENTS

| JP | 11-089222 A | 3/1999 |
| JP | 2013-094015 A | 5/2013 |
| KP | 10-2012-0000426 A | 1/2012 |

OTHER PUBLICATIONS

International Search Report on related PCT Application No. PCT/US2015/045145 from International Searching Authority (KIPO) dated Dec. 14, 2015.
Written Opinion on related PCT Application No. PCT/US2015/045145 from International Searching Authority (KIPO) dated Dec. 14, 2015.

*Primary Examiner* — Adolf Berhane
(74) *Attorney, Agent, or Firm* — Klein, O'Neill & Singh, LLP

(57) ABSTRACT

The disclosure relates to a method of generating an output voltage, comprising: generating a regulated output voltage from a high voltage source; providing an inductor having a first terminal and a second terminal linked to a low voltage source by a capacitor, the second inductor terminal supplying the output voltage to a load; connecting the first inductor terminal exclusively either to the high voltage source or to the low voltage source or to the second inductor terminal, as a function of command signals to reduce a difference between the output voltage and a reference voltage lower than a high voltage supplied by the high voltage source; and generating a square binary control signal having a duty cycle substantially adjusted to the ratio of the output voltage to the high voltage; the first inductor terminal being connected to the high voltage source or to the low voltage source as a function of a binary state of the control signal.

12 Claims, 11 Drawing Sheets

(56) References Cited

U.S. PATENT DOCUMENTS

| | | | | |
|---|---|---|---|---|
| 8,575,911 B2 * | 11/2013 | Cheng | ................... | H02M 1/14 323/283 |
| 2005/0093526 A1 * | 5/2005 | Notman | .............. | H02M 3/1582 323/282 |
| 2007/0247129 A1 * | 10/2007 | Jacobs | ................. | H02M 3/157 323/282 |
| 2009/0108823 A1 * | 4/2009 | Ho | ..................... | H02M 3/1582 323/282 |
| 2011/0221407 A1 | 9/2011 | Kato | | |
| 2012/0146602 A1 * | 6/2012 | Chen | ................... | H02M 3/1582 323/282 |

* cited by examiner

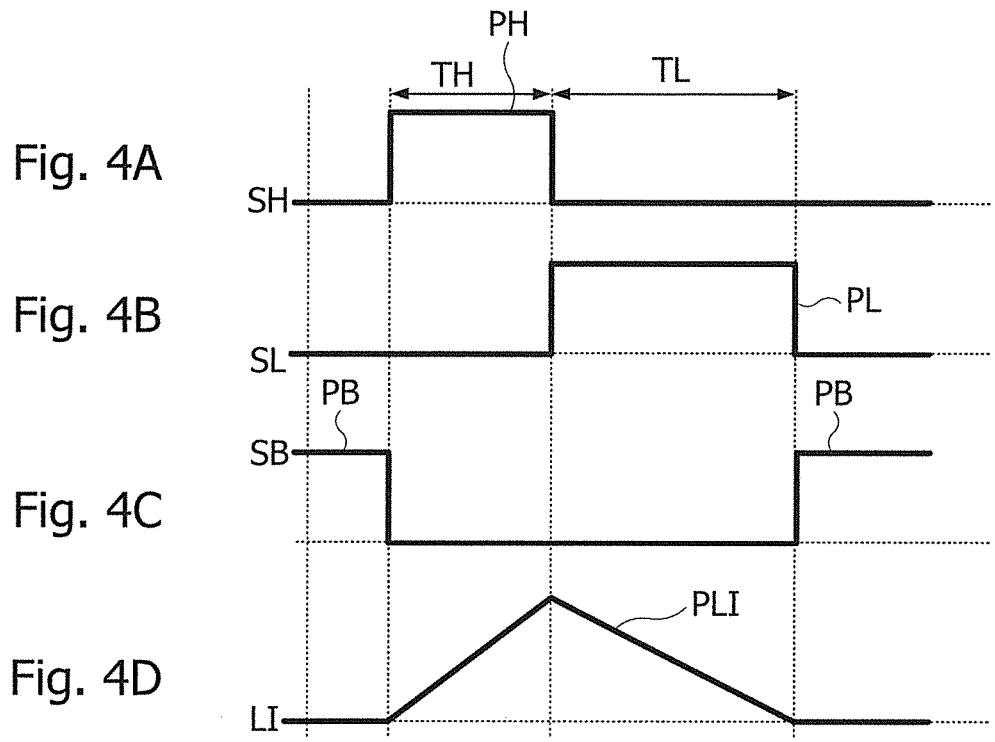
Fig. 4A
Fig. 4B
Fig. 4C
Fig. 4D
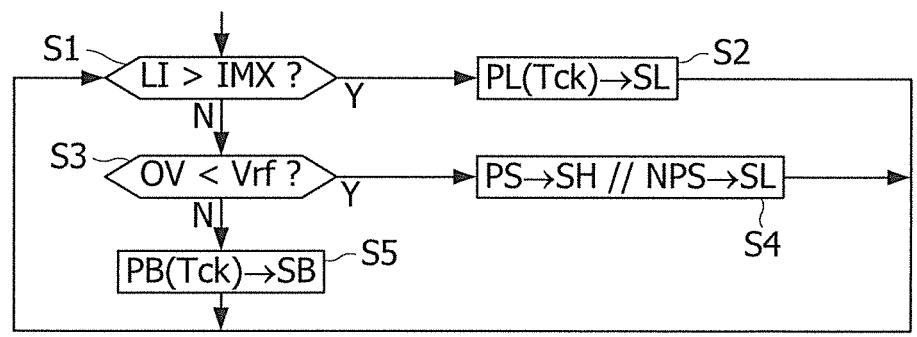
Fig. 5

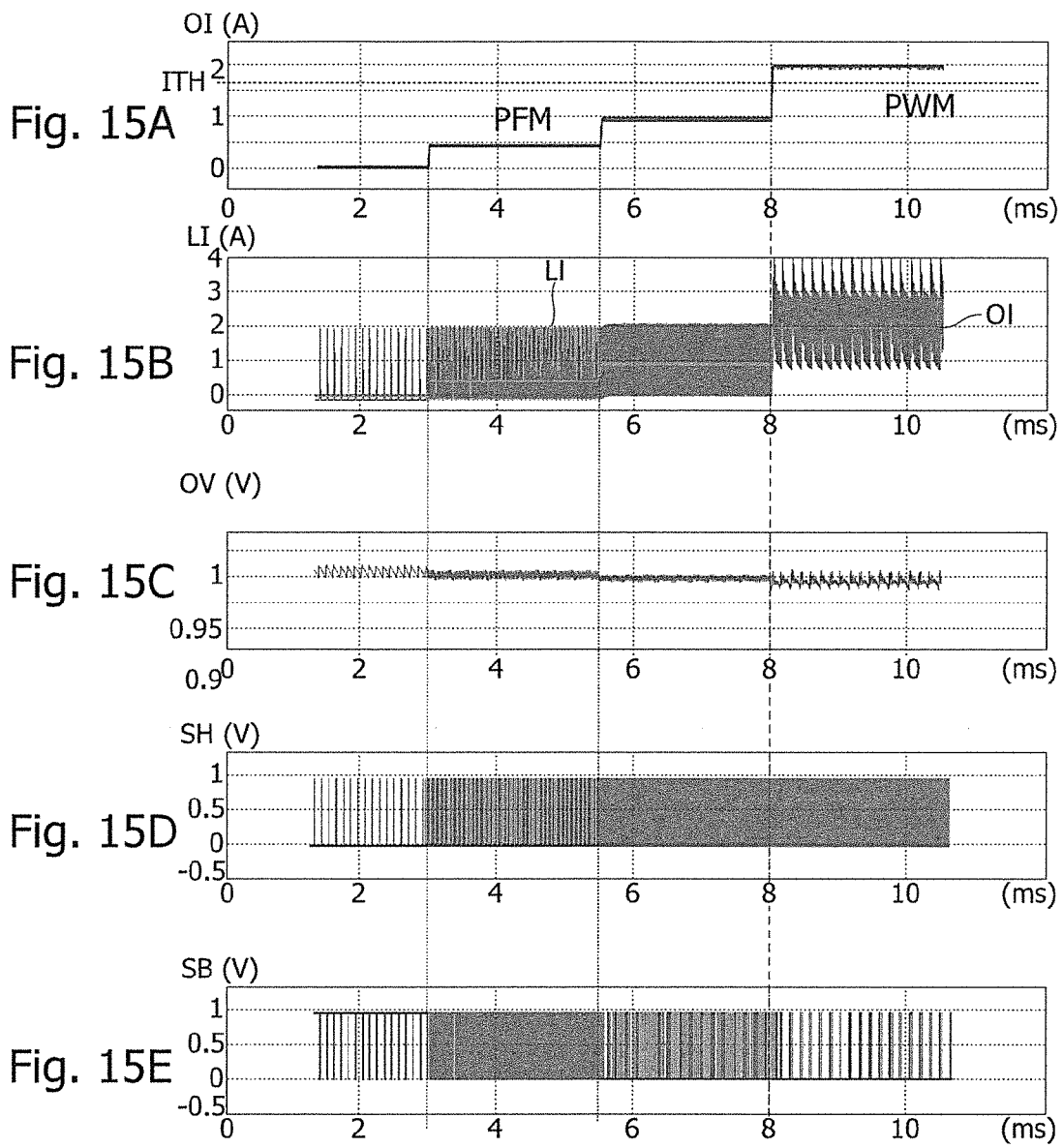
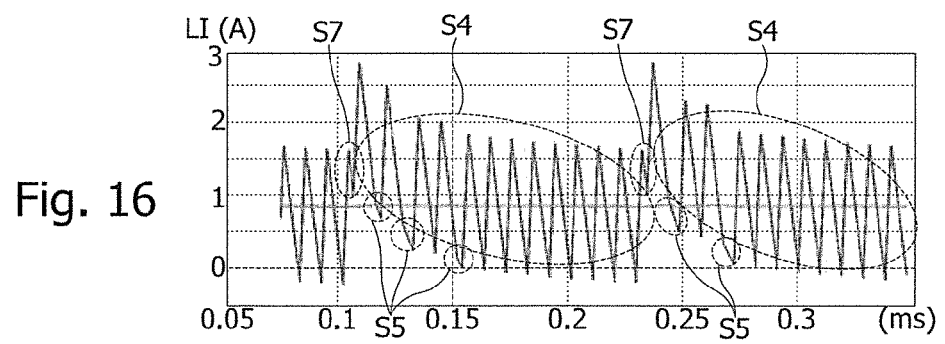

SWITCHED POWER STAGE AND A METHOD FOR CONTROLLING THE LATTER

CROSS REFERENCE TO RELATED APPLICATIONS

This application claims the benefit of the filing date of U.S. Provisional Patent Application No. 62/037,063, filed on Aug. 13, 2014, the disclosure of which is incorporated by reference herein.

BACKGROUND OF THE INVENTION

The present disclosure generally relates to power stages and voltage converters, and especially to DC-DC converters or switched voltage regulators, capable of varying output voltage and current as a function a processing load of circuits powered by such a converter.

Switched voltage converters are used to convert between differing DC voltages in a wide range of applications. Among switched voltage converters, step-down converters are used to provide a reduced voltage from a higher voltage supply. Typical uses of switched power stages comprise DC-DC converters in particular for battery-operated devices, power stage for class-D amplifiers including audio amplifiers, motor drive circuits, photovoltaic inverters, etc. Such a switched power stage is schematically shown in FIG. 1. The power stage PWS comprises switches SW1, SW2 which are used to alternately connect a first terminal of an inductor L1 to a supply voltage IV and to a k-low voltage such as ground voltage, at a switching frequency. A second terminal of the inductor L1 is connected to a load LD and linked to the ground by a capacitor C1. The switches SW1, SW2 are controlled by respective signals SH and SL provided by a control circuit CTL, so that when the switch SW1 is turned on, the switch SW2 is turned off and conversely.

In battery-operated devices such as mobile phones, smart phones, digital tablets, there is a need to increase the battery life. To this purpose, the circuits of the device that are not used are powered off or receive a reduced power. Thus the supply current requested by the device may dramatically vary. When one or more circuits of the device are deactivated, the current drawn by the device may drop very shortly, thus resulting in a voltage overshoot if the supplied current does not follow this drop. This voltage overshoot may be reduced by increasing the size of the capacitor C1.

In addition to the voltage overshoot, the current ripple of the inductor should be taken into account to reduce switching core loss of the inductor and keep the peak current within the maximum current rating of the inductor and the battery. The optimization of switching losses while maintaining the average current loads closer to the maximum rating constrains the range of inductor values appropriate for a given input to output voltage ratio and operating frequency. For a DC-DC converter operating with 1 Mhz or slower PWM control, the inductor should typically be sized to 1 µH or larger to meet these constraints. Such a big inductor cannot be compact and integrated in a semiconductor chip. Conversely when a circuit of the powered device is activated, it should be powered on in a very short time, inducing a sudden rise of the current drawn by the device. One way to follow such a current draw is to reduce the size of the inductor L1.

Preferably, components of small height and reduced surface on printed-circuit boards are used to manufacture thin and small devices. This generally serves to reduce the size of inductor L1 and capacitor C1, and thus to increase the commutation frequency of the switches SW1, SW2, which increases the energy losses in the switches.

Further, each new generation of processors used in such portable devices tends to be more powerful while being smaller and operating at lower supply voltages. In addition, to increase their life by reducing the current supplied by each battery cell, the number of battery cells assembled both in series and in parallel within the batteries tends to increase. Accordingly the input voltage of the DC-DC converter tends to increase whereas the output voltage to be supplied to the devices tends to decrease, which requires a bigger inductor. This results in subjecting the inductor to conflicting requirements.

BRIEF SUMMARY OF THE INVENTION

Embodiments of the disclosure relate to a switching regulator with a reference pulse width modulation (PWM) reference circuitry, comprising: switches for coupling a first terminal of an output inductor alternatively to a supply voltage or to ground based on a duty cycle signal, the output inductor having a second terminal coupled to ground by a capacitor and providing a voltage output signal; reference switches for coupling an input of a circuit including a reference capacitor alternatively to the supply voltage or to ground based on the duty cycle signal, the reference capacitor coupled to ground; an error amplifier for amplifying a difference between an output of the circuit including a reference capacitor and a reference voltage; a waveform generator for generating a periodic waveform having a period based on a clock signal; and a first comparator for comparing the periodic waveform and an output of the error amplifier, an output of the comparator providing the duty cycle signal.

Embodiments of the disclosure also relate to a method of generating a regulated voltage, comprising: providing an inductor having a first terminal and a second terminal linked to a low voltage source by a capacitor, the second inductor terminal supplying a regulated output voltage to a load; connecting the first inductor terminal exclusively either to a high voltage source or to the low voltage source or to the second inductor terminal, as a function of command signals to reduce a difference between the output voltage and a reference voltage lower than the high voltage; and generating a binary control signal using a reference circuit, the binary control signal having a duty cycle substantially adjusted to the ratio of the output voltage to a high voltage supplied by the high voltage source, the first inductor terminal being connected to the high voltage source or to the low voltage source as a function of a binary state of the control signal.

Embodiments of the disclosure also relate to a switched power stage providing a regulated output voltage, the power stage comprising: an inductor having a first inductor terminal and a second inductor terminal forming an output of the power stage, a switching device linking the first inductor terminal exclusively either to a high voltage source, or to a low voltage source, or to the second inductor terminal, a capacitor linking the second inductor terminal to the low voltage source, and a control circuit configured to control the switching device as a function of a high voltage supplied by the high voltage source and the output voltage, to reduce a difference between the output voltage and a reference voltage lower than the high voltage, the control circuit including a reference circuit configured to generate a square binary control signal having a duty cycle substantially adjusted to the ratio of the reference voltage to the high voltage, and the control circuit configured to control the switching device to connect the first inductor terminal either to the high voltage source or to the low voltage source as a function of a binary state of the control signal.

These and other aspects of the invention are more fully comprehended upon review of this disclosure.

BRIEF DESCRIPTION OF THE FIGURES

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 4A, 4B, 4C, 4D show variations curves of signals as a function of time illustrating operation of the switched power stage, according to an embodiment, FIG. 5 is a flow chart illustrating a process performed by the control circuit of the switched power stage, according to an embodiment, FIGS. 15A to 15E show variations curves of signals as a function of time illustrating operation of the switched power stage, when current drawn from the load varies, according to another embodiment, FIG. 16 shows a part of the curve of FIG. 15B stretched out in time.

DETAILED DESCRIPTION

Figure 1:
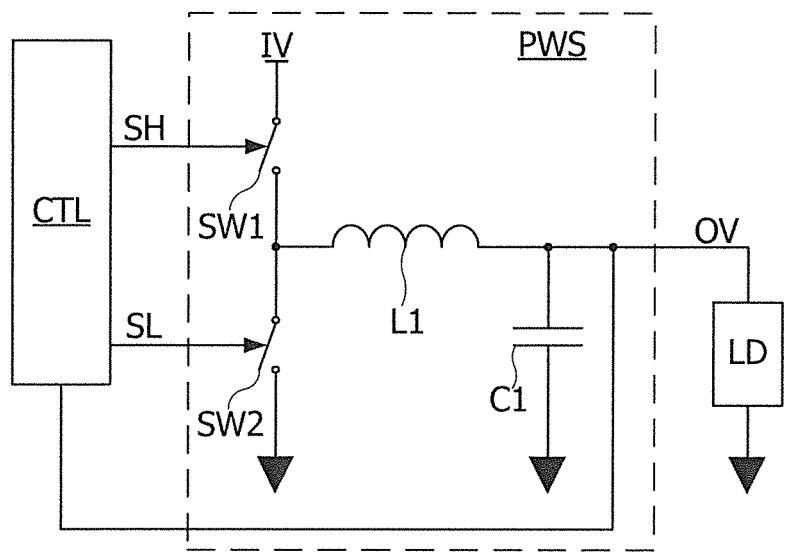
FIG. 1 previously described is a circuit diagram of a conventional switched power stage.
Figure 2:
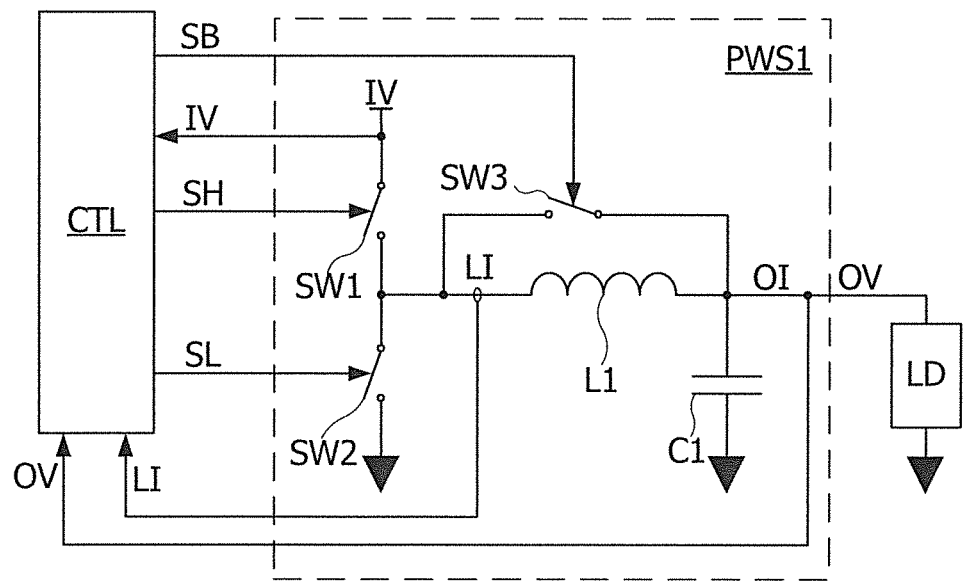
FIG. 2 is a circuit diagram of a switched power stage according to an embodiment.

FIG. 2 is a circuit diagram of a switched power stage according to an embodiment. Referring to FIG. 2, a switched power stage PWS1 of this embodiment, which is a step-down type converter, includes switches SW1, SW2, SW3, an inductor L1, a capacitor C1 and a control circuit CTL controlling the switches SW1, SW2, SW3. A first terminal of the switch SW1 is connected to a voltage source providing a positive input voltage IV. A second terminal of the switch SW1 is connected to a first terminal of the inductor L1, a first terminal of the switch SW2 and a first terminal of the switch SW3. A second terminal of the switch SW2 is connected to a low voltage source, e.g. the ground. A second terminal of the inductor L1 is connected to a second terminal of the switch SW3, and to a first terminal of the capacitor C1, which supplies an output voltage OV to a terminal of a load LD having another terminal connected to the ground. The output voltage OV is lower than the input voltage IV. The second terminal of the capacitor C1 is connected to the ground. The control circuit CTL may receive a measure signal of output voltage OV an input voltage IV. In some embodiments, current intensity measures of the current LI flowing through the inductor L1 may be provided to the control circuit CTL with input and output voltages IV, OV. In some embodiments a measure signal of a current intensity of the current OI flowing through load LD could also be provided to control circuit CTL. The control circuit CTL outputs control signals SH, SL and SB, for controlling the switches SW1, SW2 and SW3, respectively. The control circuit CTL is configured to generate the control signals SH, SL, SB as a function of input and output voltages IV, OV, and the inductor current LI, and possibly the load current OI. The control signals SH, SL, SB are used to close the switches SW1, SW2, SW3 in an exclusive manner, preferably, so that at any time not more than one of the switches SW1, SW2, SW3 is closed whereas the others of the switches SW1, SW2, SW3 are open. For this to happen, the control circuit CTL may turn off all the switches SW1, SW2, SW3 before turning on one of the latter. However some applications may require simultaneous closing of the switches SW3 and SW1 or SW3 and SW2. Such a control of switches does not generate any power loss, in contrast with simultaneous closing of the switches SW1 and SW2 which would directly link the voltage source IV to ground.

For example, the switches SW1, SW2, SW3 may be formed with MOSFET transistors, with a p-channel MOS transistor forming the switch SW1 and n-channel MOS transistors forming the switches SW2 and SW3. Measurement of the inductor current LI could be performed in any one the switches SW1, SW2 and SW3.

Figure 3A:
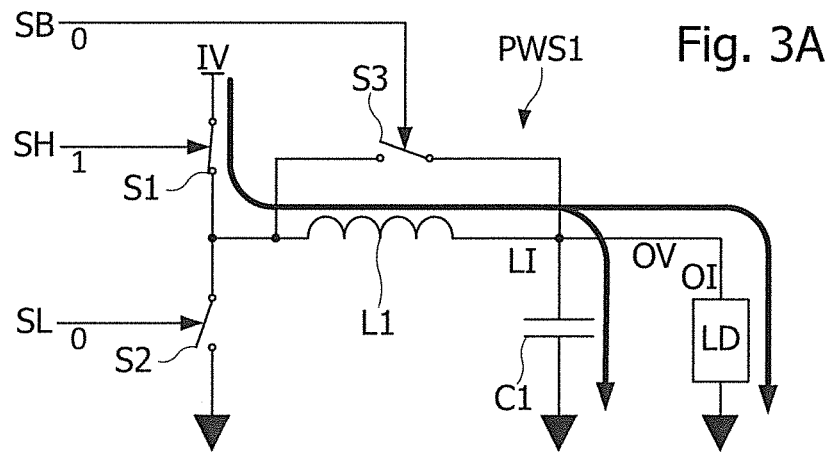
FIGS. 3A, 3B, 3C are simplified circuit diagrams of the switched power stage, illustrating operating modes of the power stage.
Figure 3B:
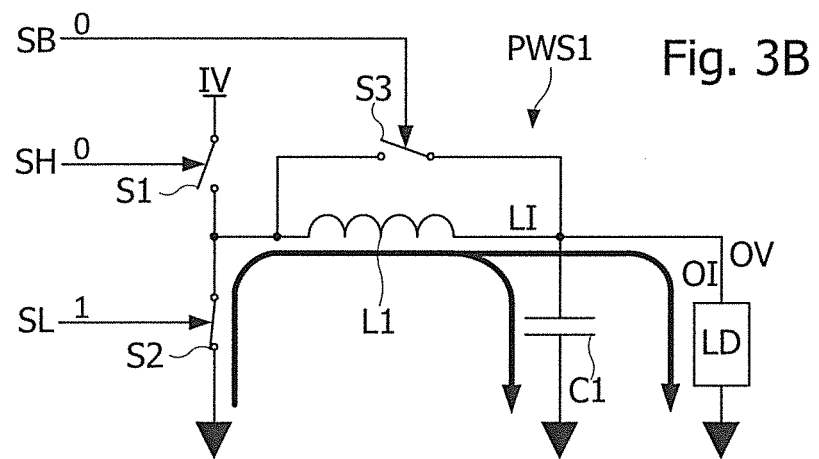
Figure 3C:
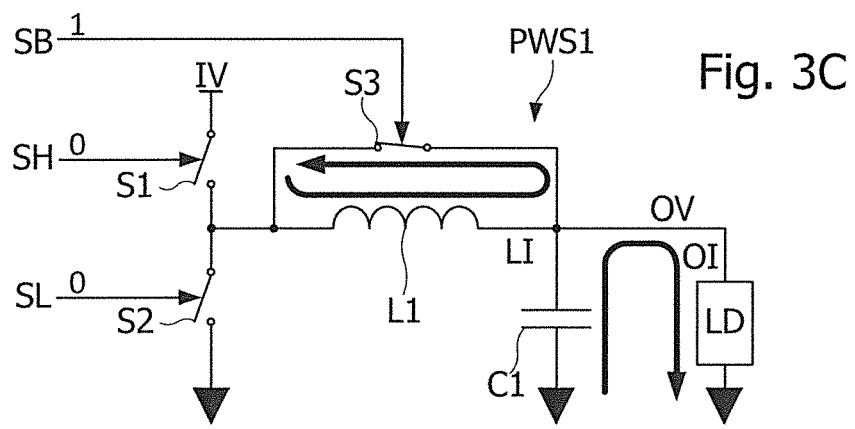

FIGS. 3A, 3B, 3C illustrate the operation of the switched power stage PWS1. In FIG. 3A, the switch SW1 is turned on, whereas the switches SW2 and SW3 are open. Thus a current flows from the voltage source supplying input voltage IV to the ground the inductor L1, through the capacitor C1 which charges and through the load LD.

In FIG. 3B, the switch SW2 is turned on, whereas the switches SW1 and SW3 are open. Thus a current flows through the inductor L1, through capacitor C1 which discharges and through the load LD to the ground.

In FIG. 3C, the switch SW3 is turned on, whereas switches SW1 and SW2 are open. Thus current flows in the loop formed by the inductor L1 and the capacitor C1 discharges through the load LD. In this state, the load current OI is exclusively supplied by capacitor C1.

FIGS. 4A, 4B, 4C and 4D show variations curves of signals as a function of time, illustrating operation of the control circuit CTL and the power stage PWS1. According to an embodiment, the control circuit CTL is configured to send series of consecutive pulses PH, PL having a square shape on its outputs SH, SL to obtain current pulses PLI in the inductor L1, the current pulses PLI having a saw-tooth or triangular waveform. FIG. 4A represents one of the pulses PH of the signal SH, FIG. 4B represents one of the pulses PL of the signal SL, FIG. 4C represents pulses PB of the signal SB and FIG. 4D represents a corresponding pulse PLI of the current LI in the inductor L1. The inductor current LI is null during the pulses PB. The rising edge of the pulse PLI corresponds to the pulse PH, and the falling edge of the pulse PLI corresponds to the pulse PL. The slope of the rising edge of the pulse PLI is determined by the duration TH of the pulse PH and the slope of the falling edge of the pulse PLI corresponds to the duration TL of the pulse PL. Thus the duration TH+TL may be chosen as small as possible to get small parasitic capacities and inductances. In contrast, the durations TH and TL may be chosen large enough to obtain pulses PLI in the inductor L1, large enough for the pulse being not filtered out by the power stage PWS1. The durations TH and TL should be greater than the switching time of the switches SW1, SW2, SW3 (for example greater than 10 ns). If the switches SW1, SW2, SW3 are implemented by MOSFET transistors, the durations TH and TL should be greater than the switching time of the transistors.

FIG. 5 is a flow chart of an example of a process executed by the logic circuit LC to control the switches SW1, SW2, SW3, according to an embodiment. This process comprises steps S1 to S5. At step S1, the inductor current intensity LI is compared with a maximum value IMX. If the current intensity LI is greater than the maximum value IMX, step S2 is performed, otherwise step S3 is performed. At step S2, a pulse PL is sent to the output SL to control the switch SW2. At step S3, the output voltage OV is compared with the reference voltage Vrf. If the output voltage OV is lower than the reference voltage Vrf, step S4 is performed, otherwise step S5 is performed. At step S4, pulses PH and PL are successively sent to the outputs SH and SL, respectively, to generate a pulse PLI in the inductor current LI as shown in FIGS. 4A, 4B and 4D. At step S5, a pulse PB is sent to the output SB. The process is performed again from step S1 after steps S2, S4 and S5. Thus the switched power stage PWS1 is mainly controlled according to two distinct modes, namely a pulse frequency modulation mode (PFM), and a pulse width modulation mode (PWM). The PFM mode is activated when the current OI drawn by the load LD is lower than a current threshold. In this mode, steps S1, S3, and S4 alternately steps S4 and S5 are carried out. The PWM mode is activated when the current OI drawn by the load LD is greater than the current threshold ITH. In this mode, only steps S1, S3 and S4 are carried out. Step S2 may be carried out at any time when needed to avoid over currents in the inductor L1.

The comparison performed at step S1, may be performed by the comparator CCP. Thus step S1 may comprise or in some embodiments consist in testing the binary signal OCP. In a same manner, the comparison performed at step S3 may be performed by the comparator VCP1. Thus the step S3 may comprise or in some embodiments consist in testing the binary signal PM.

Figure 6A:
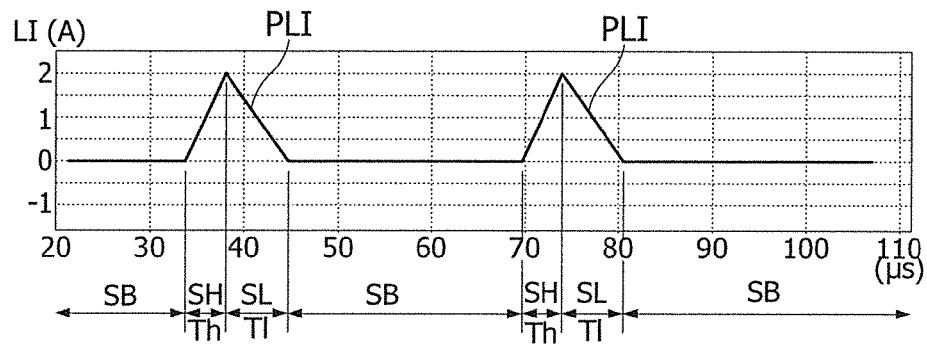
FIGS. 6A, 6B, 6C show variations curves of signals as a function of time illustrating operation of the switched power stage, when current drawn by the load varies.
Figure 6B:
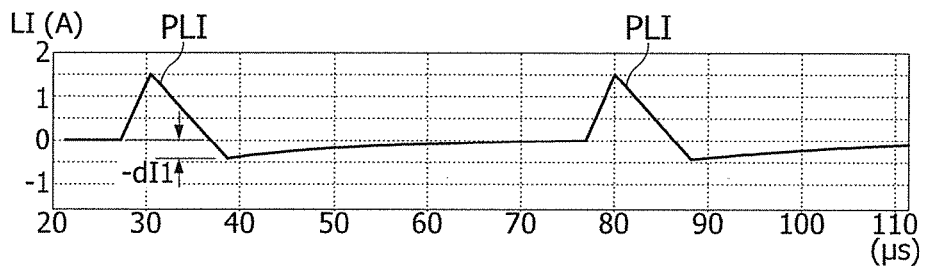
Figure 6C:
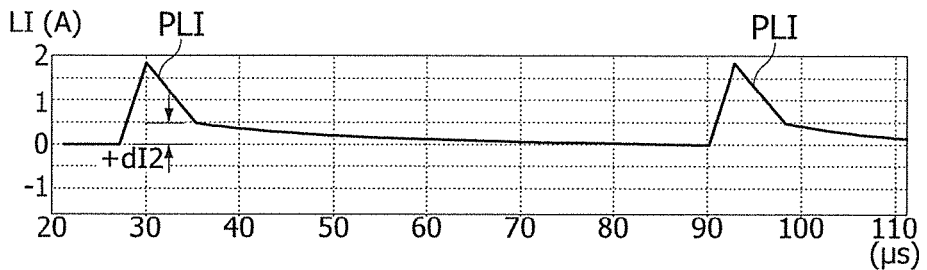

FIGS. 6A, 6B, 6C show variations curves of the inductor current LI as a function of time, when the switched power stage PWS1 is controlled in pulse frequency modulation mode (PFM), i.e. when the current OI drawn by the load LD is lower than the current threshold ITH. FIG. 6A corresponds to the ideal case which is an instable state for the switched power stage PWS1. In this case the ratio OV/IV of the output voltage OV to the input voltage IV is equal to the ratio TH/(TH+TL), TH being the duration of the pulse PH (i.e. the time when the switch SW1 is closed) and TL being the duration of the pulse PL (i.e. the time when the switch SW2 is closed). The time between two pulses PLI corresponds to the time when the switch SW3 is closed. More generally the switched power stage PWS1 controlled in PFM mode operates as represented by FIGS. 6B and 6C due to variations of the current OI drawn by the load LD. In FIG. 6B, the current LI reaches a negative value −dI1 at the end of the pulse PLI. Then in a standby state, i.e. when switch SW3 is closed, the current LI progressively reaches 0 A. In the operating case of FIG. 6B, the ratio OV/IV the output voltage OV to the input voltage IV is greater than the ratio TH/(TH+TL). In FIG. 6C, the current LI remains at a positive value +dI2 at the end of the pulse PL. Then in the standby state, when switch SW3 is closed, the current LI progressively reaches 0 A. In the operating case of FIG. 6C, the ratio OV/IV of the output voltage OV to the input voltage IV is smaller than the ratio TH/(TH+TL).

Figure 7A:
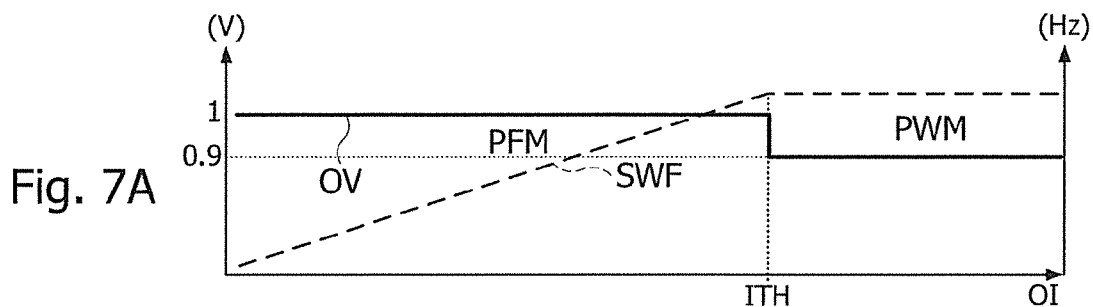
FIGS. 7A to 7F show variations curves of signals illustrating a first operating case of the switched power stage.
Figure 7B:
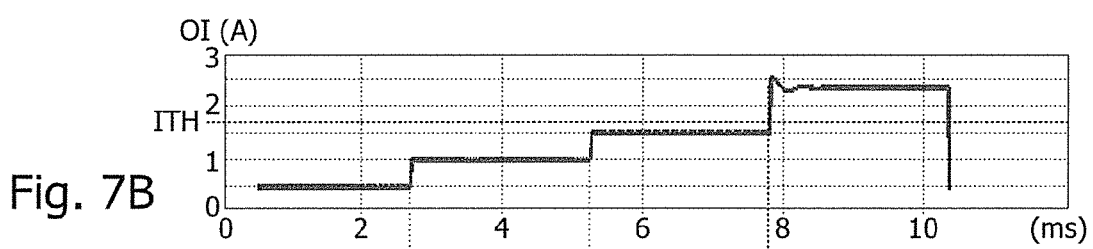
Figure 7C:
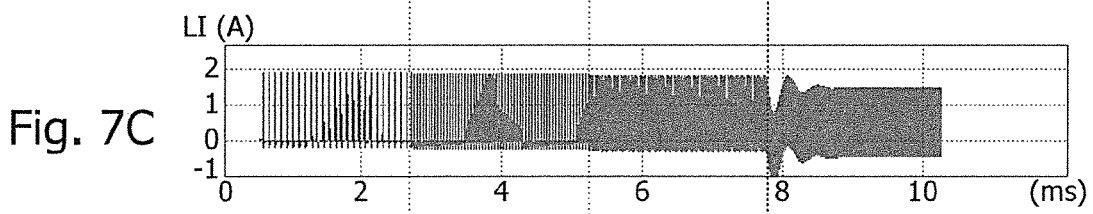
Figure 7D:
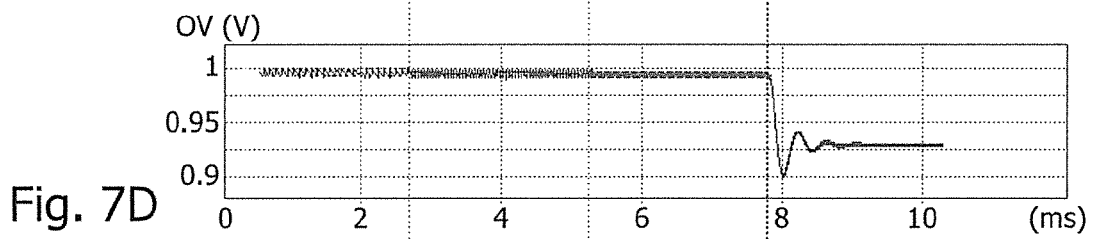
Figure 7E:
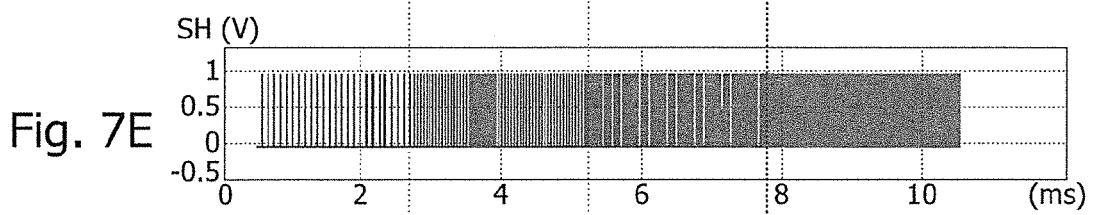
Figure 7F:
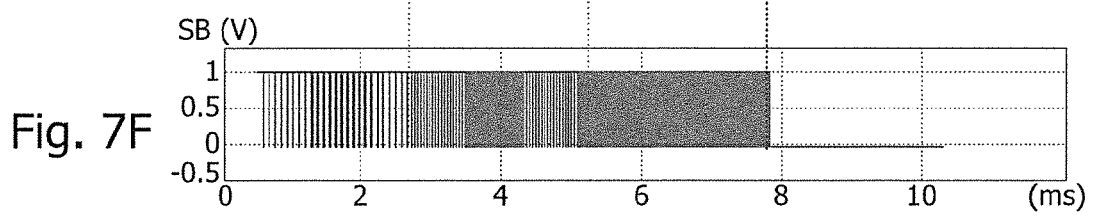

FIGS. 7A to 7F show variation curves of signals illustrating a first operating case of the switched power stage PWS1, the current OI drawn by the load increasing by steps. In this operating case, the durations TH and TL are defined such that the pulses PLI generated in the current LI have the form shown in FIG. 6B, i.e. the falling edge of the pulses PLI in the inductor current LI reaches a negative value. FIG. 7A shows theoretical curves of the output voltage OV and the switching frequency SWF of the switches SW1, SW2, SW3 as a function of the output current OI. FIG. 7B shows variations of the output current OI drawn by the load LD as a function of time. FIG. 7C shows variations of the current LI in the inductor L1 as a function of time. FIG. 7D shows variations of the output voltage OV as a function of time. FIGS. 7E and 8F show variations of the signals SH, SB controlling the switches SW1 and SW3, respectively, as a function of time. In FIG. 7B, the output current OI grows by steps in three steps from about 0.5 A to 2.5 A. In FIGS. 7A and 7D, the output voltage OV is regulated close to the set point value defined by the reference voltage Vrf (=1 V in the example of FIGS. 7A and 7D) until the output current OI reaches a current threshold ITH. Before the output current OI reaches the current threshold ITH, the power stage PWS1 is operated in PFM mode, and the switching frequency SWF (i.e. frequency of pulses PLI) linearly increases as a function of the output current OI (see FIGS. 7A, 7E and 7F). In PFM mode, the frequency SWF may be defined by the following equation:

$$SWF=(2L \cdot OI)/(OV \cdot TH \cdot TL) \quad (1)$$

where L is the inductance of the inductor L1. The current threshold ITH may be defined by the following equation:

$$ITH=(IV \cdot TH \cdot TL)/(2L \cdot (TH+TL)) \quad (2)$$

As long as the output current is above the current threshold ITH, the power stage PWS1 is operated in PWM mode. In this mode, the pulses PLI are successively generated without carrying out step S5 between them, the switch SW3 being kept open. When the output current OI is greater than the current threshold ITH, the switching frequency SWF remains at a constant value defined by the following equation:

$$SWF=1/(TH+TL) \quad (3)$$

(TH+TL) corresponding to the duration of the pulses PLI. When the output current OI reaches the threshold ITH, the output voltage OV undergoes a drop from the reference voltage Vrf(≈1 V) to about 90% of the voltage Vrf with an undershoot before reaching and remaining at about 93% of the voltage Vrf. Therefore, in the PWM operating mode, it is not possible to reach the set point value Vrf, even with the switch SW3 kept open. This is due to regulation and commutation losses appearing when the output current OI drawn by the load LD is high (above the current threshold ITH).

Figure 8A:
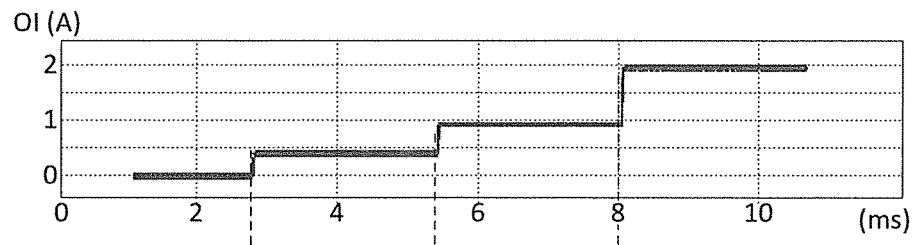
FIGS. 8A, 8B, 8C show variations curves of signals as a function of time illustrating operation of the switched power stage, when current drawn from the load varies in a second operating case.
Figure 8B:
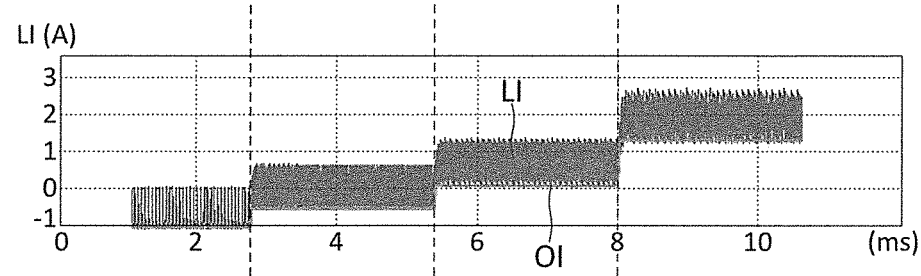
Figure 8C:
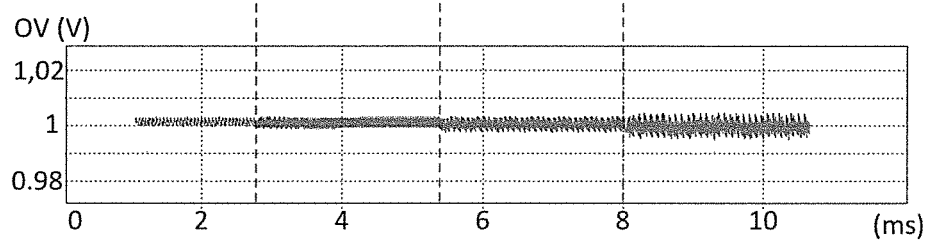
Figure 9:
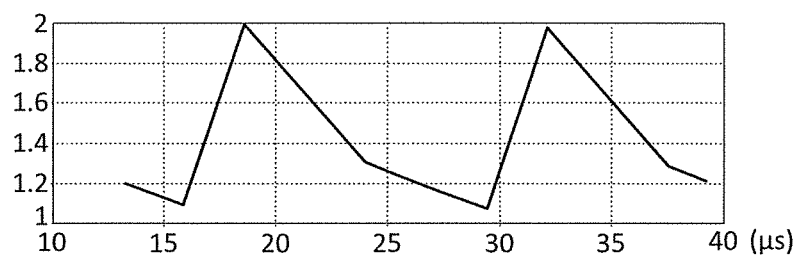
FIG. 9 shows a part of the curve of FIG. 8B stretched out in time.

FIGS. 8A to 8C show variation curves of signals as a function of time, illustrating a second operating case of the switched power stage PWS1, the current OI drawn by the load increasing by steps. In this operating case, the pulses PLI generated in the current LI have the form shown in FIG. 6C, i.e. the falling edge of the pulses PLI only reaches a positive value. FIG. 8A shows variations of the output current OI drawn by the load LD. FIG. 8B shows variations of the inductor current LI and the output current OI. FIG. 8C shows variations of the output voltage OV. In FIGS. 8A and 8B, the output current OI grows by steps in three steps from about 0.5 A to 2 A. In FIG. 8C, the output voltage OV is regulated close to the reference voltage Vrf ($\approx$1 V), for example at a value less than 1% from the reference voltage. In FIG. 9 showing a view stretched out in time of the current LI, the pulses PLI generated in the current LI have the form shown in FIG. 6C. In this operating case, the power stage PWS1 is always operated in PFM mode since the output voltage OV is sometimes greater than the reference voltage Vrf, regardless the output current OI with respect to the current threshold ITH. In this operating case, the inductor current LI remains higher than the output current OI. This results in closing and opening the switch SW3 at a high rate even when the output current OI is greater than the current threshold ITH. Thus this operating case produces high conduction losses.

According to an embodiment, the durations TH and TL are adjusted so that the ratio TH/(TH+TL) is substantially equal to OV/IV ($\approx$Vrf/IV) as in FIG. 6A.

Figure 10:
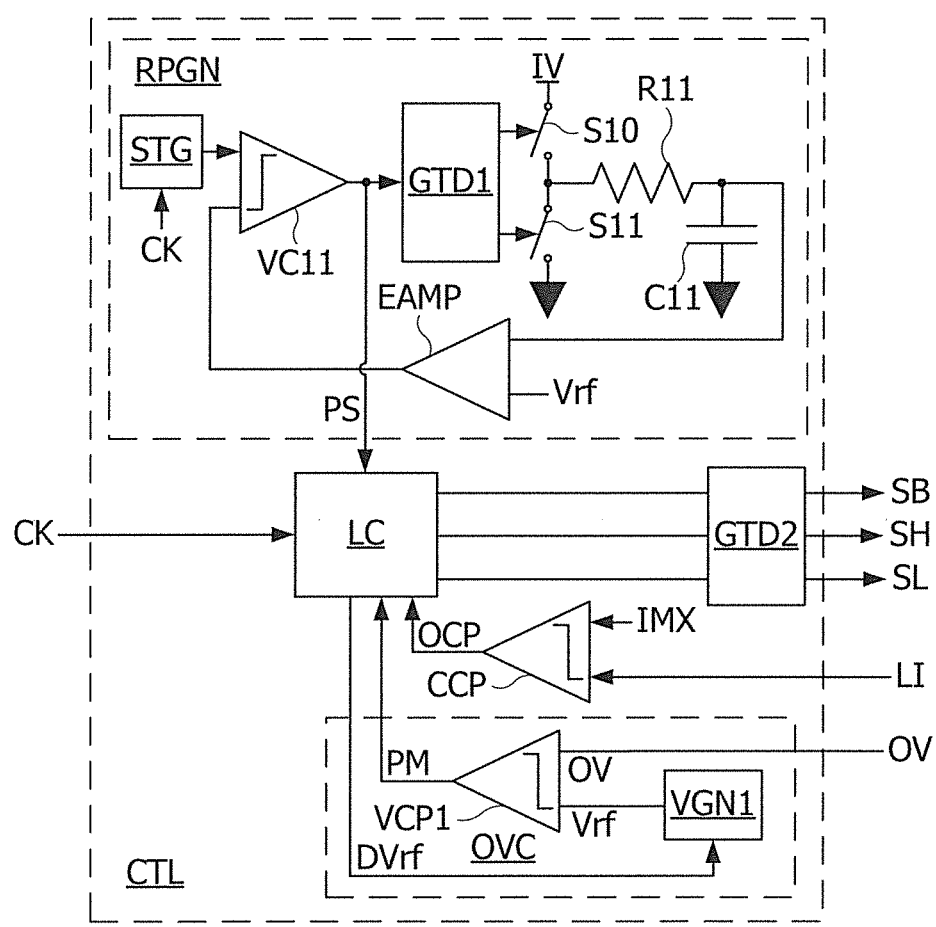
FIG. 10 is a circuit diagram of a control circuit of the switched power stage, according to an embodiment.

FIG. 10 is a circuit diagram of the control circuit CTL according to an embodiment. The control circuit CTL comprises a logic circuit LC, a current comparator CCP, a voltage comparator circuit OVC, a gate drive circuit GTD1 and a reference PWM (Pulse Width Modulation) generator circuit RPGN. The current comparator CCP receives the current LI from the inductor L1 and a current maximum value IMX and provides to the logic circuit LC a binary signal OCP, for example equal to 1 or 0, as a function of the comparison result of the inductor current LI with the maximum value IMX. The circuit OVC comprises a reference voltage generator VGN and a voltage comparator VCP1. The comparator VCP1 receives the output voltage OV and a reference voltage Vrf from the generator VGN, and provides to the logic circuit LC a binary signal PM, for example equal to 1 or 0, as a function of the comparison result of the output voltage OV with the reference voltage Vrf. The value of the reference voltage Vrf may be adjusted by a digital signal DVrf corresponding to a digital value of the reference voltage Vrf, provided by the logic circuit LC to the voltage comparator circuit OVC.

The reference PWM generator circuit RPGN comprises a waveform generator, illustrated as a sawtooth signal generator STG; switching logic, illustrated as a voltage comparator VC11, and a gate drive circuit GTD1; switches coupled in series between a voltage IV and a ground, illustrated as two switches S10, S11, and an analog section, illustrated as a low pass filter including a resistor R11, a capacitor C11, and an error amplifier EAMP. The switches and low pass filter provide a reference switched power stage. In operation, the reference PWM generator circuit develops a signal PS to maintain a duty cycle of the switches S10 and S11 so as to substantially maintain the capacitor voltage at Vrf. The duty cycle of the switches may be viewed as an ideal duty cycle for operation of the power converter. Moreover, as the analog portion of the circuit provides for first order operation stability may be more easily assured. Turning particularly to the circuit illustrated in FIG. 10, the signal generator STG receives a clock signal CK having a clock period Tck. The generator STG generates a pulsed sawtooth signal having the period Tck and pulses each having the form of a sawtooth. The sawtooth signal is provided to an input of the voltage comparator VC11. The output of the comparator VC11 provides a PWM output signal PS to a control input of each of the switches S10 and S11, though the gate drive circuit GTD2. A first terminal of the resistor R11 is linked to the input voltage source IV by the switch S10, and to the ground by the switch S11. A second terminal of the resistor R11 is linked to the ground by a capacitor C11, and is connected to an input of the error amplifier EAMP. Another input of the error amplifier EAMP receives the reference voltage Vrf. The output of the error amplifier EAMP is connected to another input of the voltage comparator VC11.

The generator STG and the comparator VC11 form a PWM generator which generates the square binary signal PS having the period Tck of the clock signal CK and a duty cycle adjusted as a function of an analog error signal provided by the error amplifier EAMP. The switches S10, S11 form an inverter powered by the input voltage IV, which provides to the resistor R11 a signal corresponding to the signal PW inverted. Thus the signal in input of the resistor R11 is at the voltage IV when the signal PS is in a low state and at the ground voltage when the signal PS is in a high state. The resistor R11 and the capacitor C11 form a low-pass filter of the first order which provides a filtered signal to the error amplifier EAMP. The duty cycle of the signal PS depends on the voltage difference between the reference voltage Vrf and the output signal of the low-pass filter R11–C11. The output signal of the low-pass filter R11–C11 depends on the input voltage IV and substantially corresponds to the voltage Vrf. The signal PS produced by the circuit RPGN has a duty cycle TH/Tck which is adjusted substantially to a value equal to the ratio Vrf/IV ($\approx$OV/IV) even if the input voltage IV varies. Therefore the pulses PLI obtained in the inductor current LI have the form as illustrated in FIG. 6A, i.e. the current LI reaches substantially 0 A and not a negative value at the end of the falling edge of the pulse PLI.

For example, the switches S10 and S11 may be formed of small MOSFET transistors, with a p-channel MOS transistor forming the switch S10 and a n-channel MOS transistor forming the switch S11. Thus the circuit comprising the switches SW11 and SW12 may be formed by a simple inverter. The gate drive circuit GTD2 may be omitted since the switches S10, S11 may be implemented by small MOS transistors. The values of the resistor R11 and capacitor C11 may be small enough to be realized within an integrated circuit. The resistor R11 may have a value of 200 k$\Omega$, and the capacitor C11 may have a capacitance of 20 pF. The gain of the error amplifier EAMP may be in the order of 100000.

The logic circuit LC receives the clock signal CK or another clock signal and is configured to generate the control signals SH, SL, SB as a function of the signals OCP, PM and PS. The control signals SH, SL, SB are appropriately adapted by the gate drive circuit GTD1 to control switches SW1, SW2 and SW3. The gate drive circuit GTD1 may be omitted as the switches SW1, SW2 and SW3 can be controlled directly by logical signals generated by the logic circuit LC. The logic circuit LC may be a wired logic circuit. To realize the process of FIG. 5, the logic circuit LC may implement the following logic equations:

SB=CK AND (NOT OCP) AND (NOT PM)

SL=(CK AND OCP) OR [PM AND (NOT PS) AND (NOT OCP)]

SH=PM AND PS AND (NOT OCP)

Figure 11:
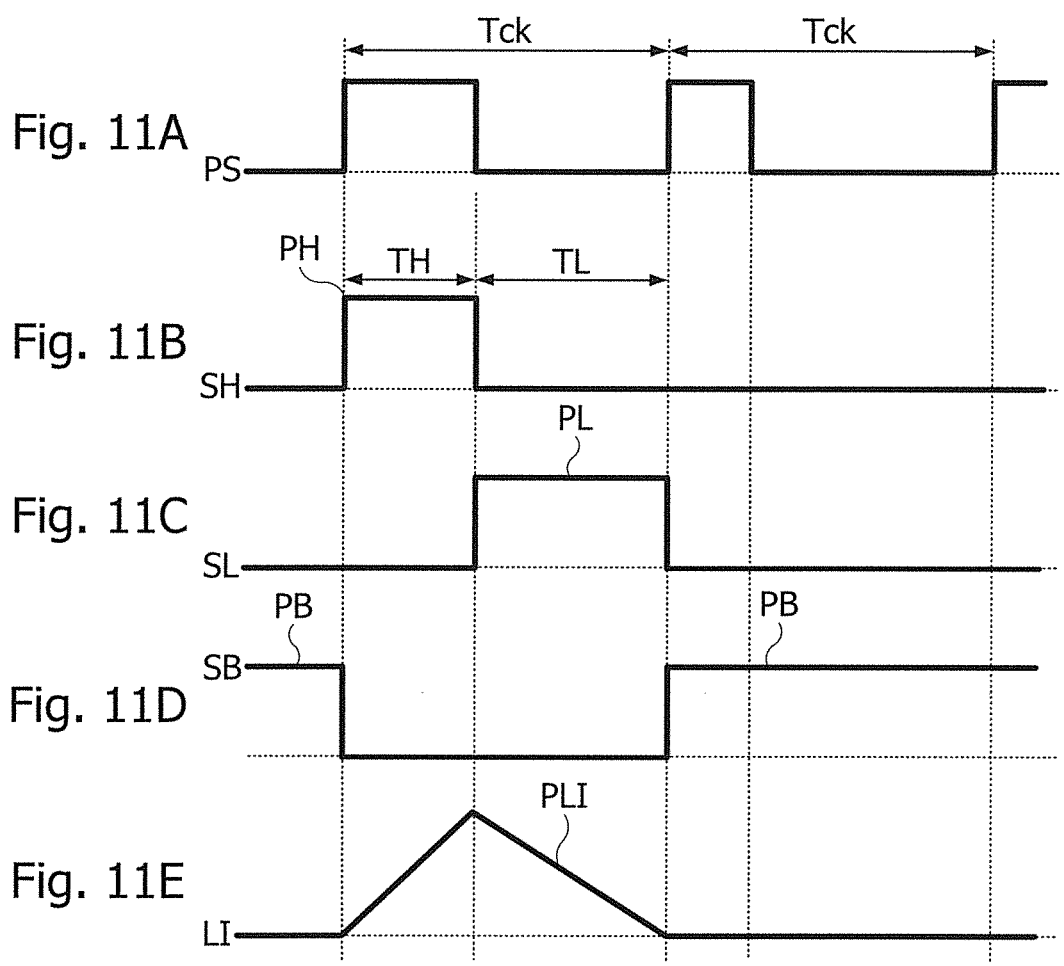
FIGS. 11A to 11E show variations curves of signals as a function of time, illustrating operation of the switched power stage, according to a first operating case.

FIGS. 11A, 11B, 11C, 11D and 11E show variations curves of signals as a function of time, illustrating operation of the control circuit CTL and the power stage PWS1 controlled in PFM mode. FIG. 11A shows examples of pulses of the signal PS generated by the circuit RPGN. FIGS. 11B and 11C show respectively the signals SH and SL corresponding to the signal PS. FIG. 11D shows pulses PB of the signal SB and FIG. 11E show a corresponding pulse PLI of the current LI in the inductor L1. The signals SH and SL are set to 0 during the pulses PB. Therefore, the inductor current LI is also set to 0 A. When the signal SB is set to 0, the signal SH has substantially the shape of the signal PS, and the signal SL corresponds to the inverted signal PS or SH (between 0 and 1). In PFM mode, the inductor current LI has pulses PLI and periods when it is set to 0 by pulses PB. In FIG. 11B, the signal SH forms a pulse PH having a duration TH. Just after the pulse PH, the signal SL forms a pulse PL having a duration TL. The rising edge of the pulse PLI which corresponds to the pulse PH has the duration TH. The falling edge of the pulse PLI which corresponds to the pulse PL has the duration TL. Therefore the rising edge of the pulse PLI has a slope corresponding to the duration TH of the pulse PH and the falling edge of the pulse PLI has a slope corresponding to the duration TL of the pulse PL. As the duty cycle (equal to TH/(TH+TL)=TH/Tck) of the signal PS (or SH) is adjusted as a function of the input voltage IV and the reference voltage Vrf, the shape of the pulse PLI may be continuously adjusted to satisfy the equation TH/(TH+TL)≈Vrf/IV. Therefore, the pulses PLI may be constrained to reach substantially 0 A or a small negative value at the end of the falling edge as shown in FIG. 6A.

Figure 12:
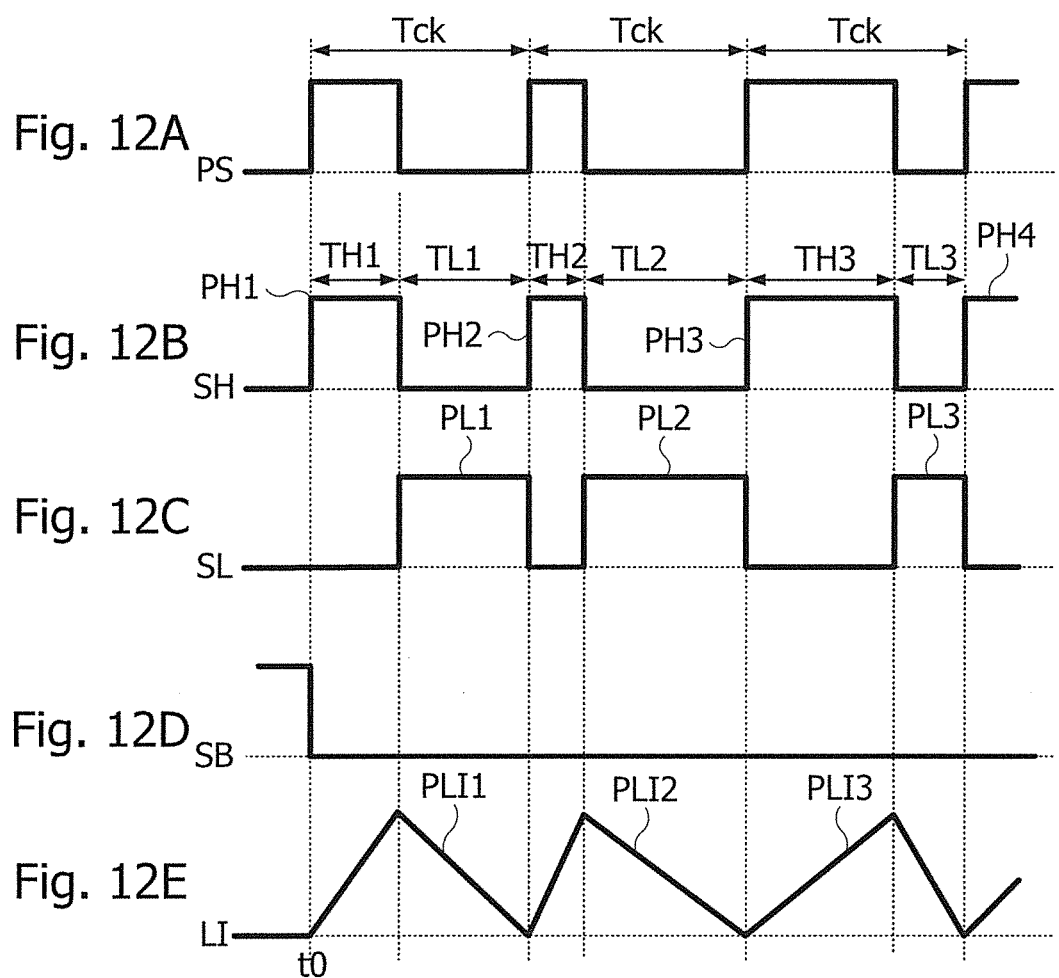
FIGS. 12A to 12E show variations curves of signals as a function of time, illustrating operation of the switched power stage, according to a second operating case.

FIGS. 12A, 12B, 12C, 12D and 12E show variations curves of signals as a function of time, illustrating operation of the control circuit CTL and the power stage PWS1 controlled in PWM mode. FIG. 12A shows examples of pulses of the signal PS generated by the circuit RPGN, having different duty cycles. FIGS. 12B and 12C represent respectively the signals SH and SL corresponding to the signal PS. FIG. 12D represents the signal SB which is fixed to 0 from an instant t0, and FIG. 12E represents the inductor current LI. In PWM mode, pulses appear in the inductor current LI without dead times where the inductor current is forced to 0 A between the pulses. The inductor current LI comprises a pulse PLI1 corresponding to pulses PH1 in the signal SH and PL1 in the signal SL, a pulse PL2 corresponding to pulses PH2 in the signal SH and PL2 in the signal SL, and a pulse PL3 corresponding to pulses PH3 in the signal SH and PL3 in the signal SL. For each pulse PLIi (i being equal to 1, 2, and 3), the duty cycle THi/Tck of the signal PS (or SH) is adjusted by the circuit RPGN as a function of the reference voltage Vrf and the input voltage IV.

Figure 13:
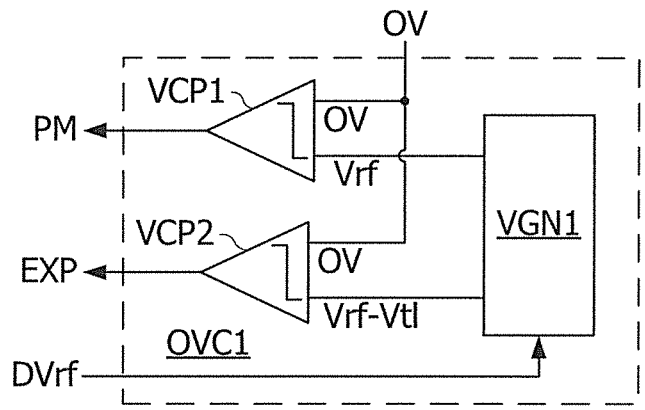
FIG. 13 is a circuit diagram of a circuit of the control circuit, according to another embodiment.

FIG. 13 is a circuit diagram of the voltage comparator circuit according to another embodiment. The voltage comparator circuit OVC1 of FIG. 13 comprises a reference voltage generator VGN1, the voltage comparator VCP1 and another voltage comparator VCP2. The generator VGN1 is configured to generate a first reference voltage Vrf and a second reference voltage which may be derived from the reference voltage, e.g. equal to Vrf−Vtl. The voltage Vtl may be set to a fraction of the reference voltage Vrf, smaller than an admitted regulation error for the output voltage OV. The voltage Vtl is set for example to a value in the interval from 0.5% to 1.5% of the reference voltage Vrf. The comparator VCP1 receives the output voltage OV and the first reference voltage Vrf from the generator VGN1. The comparator VCP1 provides to the logic circuit LC the binary signal PM, for example equal to 1 or 0, as a function of the comparison result of the output voltage OV with the first reference voltage Vrf. The comparator VCP2 receives the output voltage OV and the second reference voltage Vrf−Vtl from the generator VGN1. The comparator VCP2 provides to the logic circuit LC a binary signal EXP for example equal to 1 or 0, as a function of the comparison result of the output voltage OV with the second reference voltage Vrf−Vtl.

Figure 14:
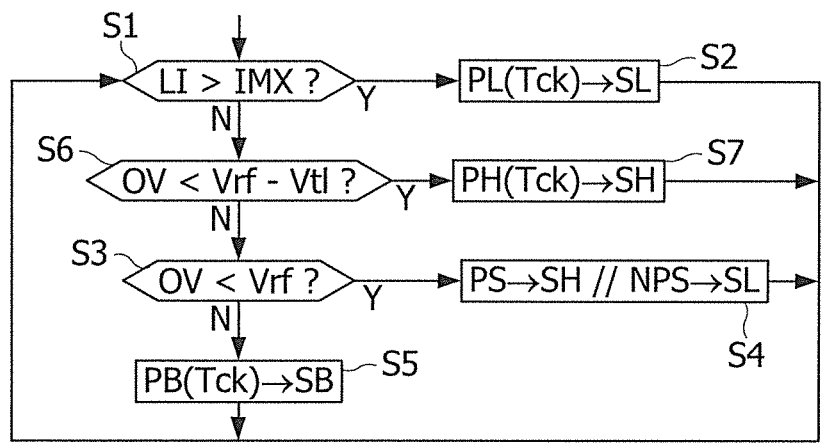
FIG. 14 is a flow chart illustrating a process executed by the control circuit of the switched power stage, according to another embodiment.

FIG. 14 is a flow chart of an example of a process executed by the logic circuit LC of the switched power stage PWS1 to control switches SW1, SW2, SW3, according to another embodiment. This process comprises steps S1 to S5 as previously described referring to FIG. 5, and additional steps S6 and S7. Step S6 is performed after step S1 and before step S3, when the inductor current LI is not greater than the maximum value IMX. At step S6, the output voltage OV is compared with the second reference voltage Vrf Vtl. If the output voltage OV is lower than the second reference voltage Vrf Vtl, step S7 is performed, otherwise step S3 is performed. At step S7, the switch SW1 is closed for the period Tck. The process is performed again from step S1 after steps S2, S4, S5 and S7. The comparison performed at step S6 may be performed by the voltage comparator VCP2, the step S6 then consisting in testing the value of the binary signal EXP. Thus step S3 is carried out only when the output voltage OV is greater than or equal to the second reference voltage Vrf−Vtl and lower than the first reference voltage Vrf. To realize the process of FIG. 14, the logic circuit LC may implement the following logic equations:

SB=CK AND (NOT OCP) AND (NOT EXP)

SL=(CK AND OCP) OR [PM AND (NOT PS) AND (NOT OCP)]

SH=(CK AND EXP) OR [PM AND PS AND (NOT OCP)]

FIGS. 15A to 15E show variation curves of signals as a function of time, illustrating the behavior of the switched power stage PWS1, when the logic circuit LC performs the process of FIG. 14 and the current OI drawn by the load is increased by steps. FIG. 15A shows the variations of the output current OI drawn by the load LD. FIG. 15B shows the variations of the inductor current LI and the output current OI. FIG. 15C shows the variations of the output voltage OV. FIGS. 15D and 15E show the variations of the signals SH and SB controlling the switches SW1 and SW3, respectively. In FIG. 15A, the output current OI grows by steps in three steps from about 0.5 A to 2.5 A (above the current threshold value ITH). In FIG. 15C, the output voltage OV is regulated close to the set point value defined by the reference voltage Vrf (=1 V in the example of FIG. 15C) even when the output current OI reaches and exceeds the current threshold ITH. When the output current OI is lower than the current threshold ITH, the power stage is operated in PFM mode. The switching frequency of the switches SW1 (FIG. 15D), SW2 and SW3 (FIG. 15E) is increased as the output current OI drawn by the load LD increases. When the output current OI exceeds the current threshold value ITH, the power stage PWS1 is operated in PWM mode. A view stretched out in time of the inductor current LI variations when the output current OI exceeds the current threshold value ITH is shown in FIG. 16. FIG. 16 shows when steps S4, S5 and S7 are performed in PWM mode. The pulses PH introduced at step S7 avoid the drop of the output voltage OV appearing in FIG. 7D when the output current OI exceeds the current threshold ITH. Also it may be observed that the end of the falling edges of the pulses PLI is slowly decreasing, revealing that the duty cycle is adjusted by the circuit RPGN at a value slightly below the ratio OV/IV.

It may be observed in FIG. 15B that the inductor current LI has an average value substantially following the output current OI. Thus the power stage PWS1 has an improved efficiency due to lower conduction losses even when a high current OI is drawn by the load LD.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In particular, other methods for controlling the switches SW1, SW2, SW3 may be derived from the methods disclosed to regulate the output voltage as a function of a reference voltage.

Further, steps S1 and S2 and the use of the signal OCP are not involved in the regulation of the output voltage OV itself, but is merely intended to protect the inductor L1 against overcurrents. Since such overcurrents do not necessarily occur, steps S1 and S2 or the use of the signal OCP may be omitted. In addition, such a protection could be performed using many other known means.

Further, other circuits may be used to generate a square signal having a duty cycle TH/Tck substantially adjusted to the ratio OV/IV (or Vrf/IV).

Further, the present invention is not limited to a power stage with a single inductor. Thus inductor L1 may be formed by several inductors connected in series, and a respective switch may be connected in parallel to each inductor as switch SW3. The switches connected in parallel with the inductors may be controlled separately to adjust the inductance of the power stage. Moreover, each junction node between two inductors may be linked to ground by a capacitor.

Although the invention has been discussed with respect to various embodiments, it should be recognized that the invention comprises the novel and non-obvious claims supported by this disclosure.

What is claimed is:

1. A switching regulator with a reference pulse width modulation (PWM) reference circuitry, comprising:
   switches for coupling a first terminal of an output inductor alternatively to a supply voltage or to ground based on a duty cycle signal, the output inductor having a second terminal coupled to ground by a capacitor and providing a voltage output signal;
   reference switches for coupling an input of a circuit including a reference capacitor alternatively to the supply voltage or to ground based on the duty cycle signal, the reference capacitor coupled to ground;
   an error amplifier for amplifying a difference between an output of the circuit including the reference capacitor and a reference voltage;
   a waveform generator for generating a periodic waveform having a period based on a clock signal; and
   a first comparator for comparing the periodic waveform and an output of the error amplifier, an output of the comparator providing the duty cycle signal.

2. The switching regulator of claim 1, wherein the circuit including a reference capacitor comprises a low pass filter.

3. The switching regulator of claim 2, wherein the low pass filter is a first order circuit.

4. The switching regulator of claim 1, where the waveform generator is a sawtooth signal generator.

5. The switching regulator of claim 1, further comprising a second comparator for comparing the voltage output signal to the reference voltage, and wherein the switches additionally operate based on an output of the second comparator.

6. The switching regulator of claim 5, further comprising logic circuitry configured for generating signals to control the switches based on the duty cycle signal and the output of the second comparator.

7. The switching regulator of claim 6, further comprising a bypass switch for selectively coupling the first terminal of the output inductor to the second terminal of the output inductor.

8. The switching regulator of claim 7, wherein the logic circuitry is additionally configured for controlling the bypass switch based on the output of the second comparator.

9. A method of generating a regulated voltage, comprising:
   providing an inductor having a first terminal and a second terminal linked to a low voltage source by a capacitor, the second inductor terminal supplying a regulated output voltage to a load;
   connecting the first inductor terminal exclusively either to a high voltage source or to the low voltage source or to the second inductor terminal, as a function of command signals to reduce a difference between the output voltage and a reference voltage lower than the high voltage; and
   generating a binary control signal using a reference circuit, the binary control signal having a duty cycle substantially adjusted to the ratio of the output voltage to a high voltage supplied by the high voltage source, the first inductor terminal being connected to the high voltage source or to the low voltage source as a function of a binary state of the control signal.

10. A method of generating a regulated voltage, comprising:
   providing an inductor having a first terminal and a second terminal linked to a low voltage source by a capacitor, the second inductor terminal supplying a regulated output voltage to a load;
   connecting the first inductor terminal exclusively either to a high voltage source or to the low voltage source or to the second inductor terminal, as a function of command signals to reduce a difference between the output voltage and a reference voltage lower than the high voltage; and
   generating a binary control signal using a reference circuit, the binary control signal having a duty cycle substantially adjusted to the ratio of the output voltage to a high voltage supplied by the high voltage source, the first inductor terminal being connected to the high voltage source or to the low voltage source as a function of a binary state of the control signal;
   wherein generating the control signal comprises:
   low-pass filtering a square wave signal to obtain a filtered signal;

generating an amplified error signal resulting from a comparison of the filtered signal with the reference voltage; and forming the control signal based on a comparison of the amplified error signal and a periodic wave form signal.

11. A switched power stage providing a regulated output voltage, the power stage comprising:
   an inductor having a first inductor terminal and a second inductor terminal forming an output of the power stage,
   a switching device linking the first inductor terminal exclusively either to a high voltage source, or to a low voltage source, or to the second inductor terminal,
   a capacitor linking the second inductor terminal to the low voltage source, and
   a control circuit configured to control the switching device as a function of a high voltage supplied by the high voltage source and the output voltage, to reduce a difference between the output voltage and a reference voltage lower than the high voltage, the control circuit including a reference circuit configured to generate a square binary control signal having a duty cycle substantially adjusted to the ratio of the reference voltage to the high voltage, and the control circuit configured to control the switching device to connect the first inductor terminal either to the high voltage source or to the low voltage source as a function of a binary state of the control signal.

12. The power stage according to claim 11, wherein the reference circuit comprises:
   a pulse width modulation generator configured to generate the control signal having a duty cycle adjusted as a function of an amplified error signal;
   a low-pass filter filtering a signal based on the control to obtain a filtered signal;
   an error amplifier configured to generate the amplified error signal from a comparison of the filtered signal with the reference voltage.

* * * * *